O. G. MEREDITH.
ANIMAL TRAP.
APPLICATION FILED NOV. 28, 1919.
1,359,820.
Patented Nov. 23, 1920.
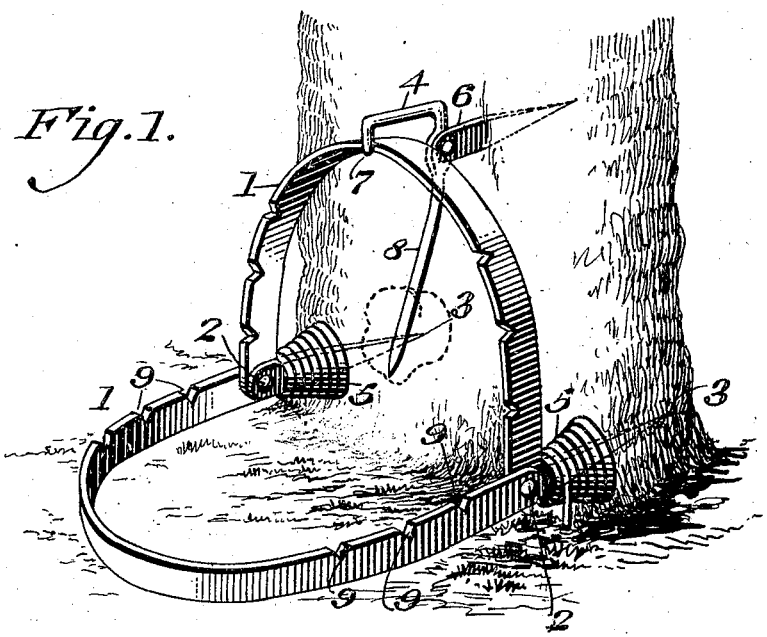
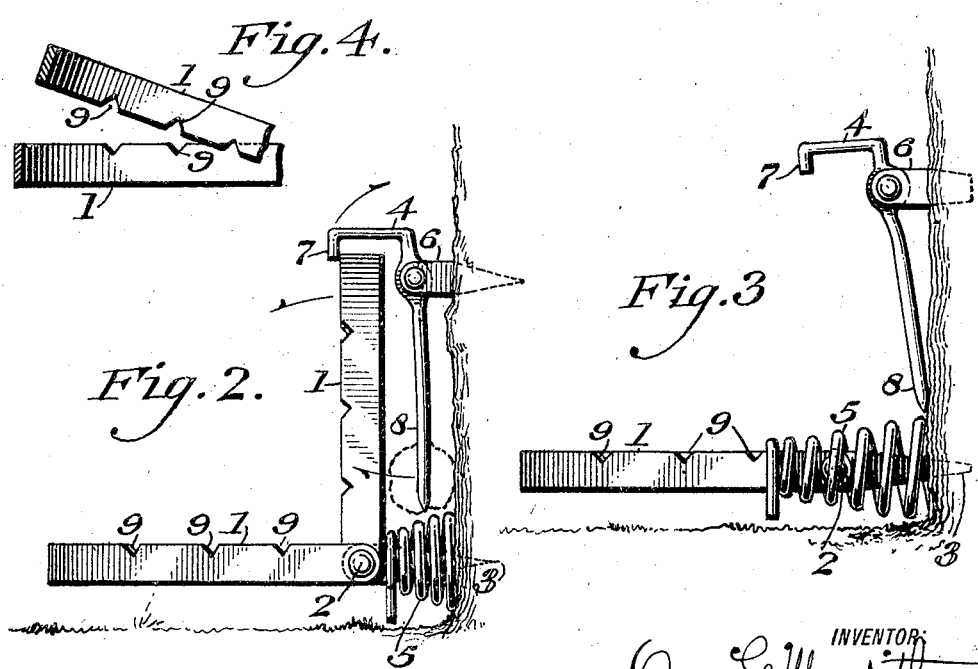
INVENTOR
Oscar G. Meredith
BY Diedersheim + Fairbanks
ATTORNEYS.

UNITED STATES PATENT OFFICE.

OSCAR G. MEREDITH, OF EAST GOSHEN TOWNSHIP, CHESTER COUNTY, PENNSYLVANIA, ASSIGNOR OF ONE-HALF TO HARRY F. TAYLOR, OF WEST CHESTER, PENNSYLVANIA.

ANIMAL-TRAP.

1,359,820.   Specification of Letters Patent.   Patented Nov. 23, 1920.

Application filed November 28, 1919. Serial No. 341,225.

*To all whom it may concern:*

Be it known that I, OSCAR G. MEREDITH, a citizen of the United States, residing at East Goshen township, in the county of Chester, State of Pennsylvania, have invented a new and useful Animal-Trap, of which the following is a specification.

My invention consists of an animal trap which is formed of pivotal jaws, a trigger adapted to hold said jaws in set position, means for supporting said jaws and trigger at the place of service, and movable pressure members adapted to close said jaws when said trigger is released, and to hold the same tightly when sprung with the animal caught therebetween, the device being of a simple, inexpensive and practical nature, as will be hereinafter set forth, the novel features thereof being pointed out in the claims.

The invention is satisfactorily illustrated in the accompanying drawings, but the important instrumentalities thereof may be varied, and so it is to be understood that the invention is not limited to the specific details shown and described, as long as they are within the spirit or scope of the claims.

Figure 1 represents a perspective view of a trap in set condition embodying my invention.

Fig. 2 represents a side elevation thereof.

Fig. 3 represents a side elevation of the trap in sprung condition.

Fig. 4 represents a partial section and partial side elevation of portions of the jaws in condition when an animal is caught therebetween.

Similar numerals of reference indicate corresponding parts in the figures.

Referring to the drawings:

1 designates a pair of jaws which are substantially of U-shape connected freely at their ends by the pivots 2, which latter are mounted on the heads of the spikes or nail-like members 3, the latter being adapted to be driven into or otherwise secured to a tree, stump, rail or other place of attachment of the trap, it being noticed that one jaw is of less diameter than the other jaw, whereby when the jaws are closing one jaw is adapted to enter the other jaw, as most plainly shown in Fig. 4, or to be concentric when fully closed, as shown in Fig. 3.

On the shanks of the spikes 3 are the coil springs 5 which in setting the trap rest against the tree, etc., and the pivotal portions of the jaws in contracted condition, so as to bear against said portions exerting pressure on the latter ready to spring the trap to close the jaws, as shown in Figs. 1 and 2, this being occasioned when the trigger 4 is operated as will be hereinafter described, but when the trap is sprung said springs are adapted to expand and ride forward and embrace the pivotal portions of the jaws and exert pressure thereon so as to bring the jaws together and close them, as shown in Fig. 3, when as an animal is trapped the jaws are prevented from opening and permitting it to escape.

The trigger 4 is of angular form and is mounted by a suitable pivot mounted in an opening in a spike or nail-like member 6 which is adapted to be driven into the tree, etc. or otherwise secured thereto, it having one end or limb provided with a nose 7 which is adapted to overlap and engage with the crown of the inner jaw 1 when the trap is set and hold the jaws in their set position and so control the same, its other or limb end 8 being adapted to provide a bait holder, the latter depending back of said jaw and being free of access through the latter, as shown in Fig. 2.

When the animal seizes the bait and draws it outwardly the trigger is operated whereby the nose 7 is raised and moved rearwardly clear of the crown of the jaw. Then as the latter is released of the trigger, the springs pressing against the same become operative and so bring the jaws quickly and forcibly together to closed position catching the animal between them, said springs then embracing the pivotal ends of both jaws keeping the jaws closed and so holding the animal caught until the jaws are reopened, or the trap is reset.

In order to prevent the animal from working itself loose or slipping from between the jaws, the latter has its opposite edges serrated as at 9 forming teeth, the effect of which is evident.

To set the trap, the springs are pushed back over the pivotal ends of the jaws and over the spikes 3, and the inner jaw is raised and engaged by the trigger, thus holding said jaw in position to be released by the operation of the trigger while the springs exert their pressure against the pivotal portion of said jaw so as to cause the forcible descent of the jaw to the other jaw, and then ride forward so as to embrace the pivotal portions of both jaws and so prevent the latter from being opened by movements of the animal.

Having thus described my invention what I claim as new and desire to secure by Letters Patent, is:—

1. In an animal trap of the character stated, a pair of jaws, a trigger and a bait holder, supports for said jaws and trigger and bait holder, on a place of service of the trap, and a slidable pressure device which is mounted freely on the support of said jaws intermediate of said place and the pivotal ends of said jaws and compressible between said jaws and said place of service and adapted when the trap is set to bear in contracted condition against said ends, said device being adapted when the trap is sprung to expand and close said jaws and to ride over said pivotal ends and embrace the latter, thus holding the jaws tightly in closed condition.

2. An animal trap consisting of a pair of jaws, a pivot therefor, a trigger and bait holder, said trigger being adapted to engage either jaw, supports for said jaws and trigger and bait holder at a place of service, and a slidable pressure device which is mounted freely on the support of said jaws and compressible between said jaws and said place of service and adapted to press against the pivotal ends of said jaws when the trap is set and to close the jaws and ride over said ends when the trap is sprung.

3. In an animal trap of the character stated, a pair of jaws, a pivot connection for said jaws, pressure means for closing said jaws, and a pin-like device adapted to be connected with a place of attachment of the trap and form the bearings for said pivotal connection and means on which said pressure means is slidable, said pressure means being compressible between the jaws and the support of the trap.

4. In an animal trap of the character stated, a pair of jaws, a pivotal connection for said jaws, pressure means for closing said jaws, a trigger adapted to engage the innermost one of said jaws and to be released therefrom, and a pin-like device adapted to be connected with a place of attachment of the trap and form the bearing for said pivotal connection, said pressure means being compressible between the place of attachment and said inner jaw when the latter is in its open position.

OSCAR G. MEREDITH.

Witnesses:
MARY H. DAVIS,
NORRIS S. INGRAM.